April 4, 1967 — J. R. SOLUM — 3,312,285
WELL PIPE CENTRALIZER
Original Filed Oct. 2, 1962 — 5 Sheets-Sheet 1

JAMES R. SOLUM
INVENTOR.

BY
ATTORNEYS

JAMES R. SOLUM
INVENTOR.

BY Lyon & Lyon
ATTORNEYS

April 4, 1967   J. R. SOLUM   3,312,285
WELL PIPE CENTRALIZER
Original Filed Oct. 2, 1962   5 Sheets-Sheet 3

JAMES R. SOLUM
INVENTOR.

BY *Lyon+Lyon*
ATTORNEYS

April 4, 1967 — J. R. SOLUM — 3,312,285
WELL PIPE CENTRALIZER
Original Filed Oct. 2, 1962 — 5 Sheets-Sheet 4

JAMES R. SOLUM
INVENTOR.

BY Lyon & Lyon
ATTORNEYS

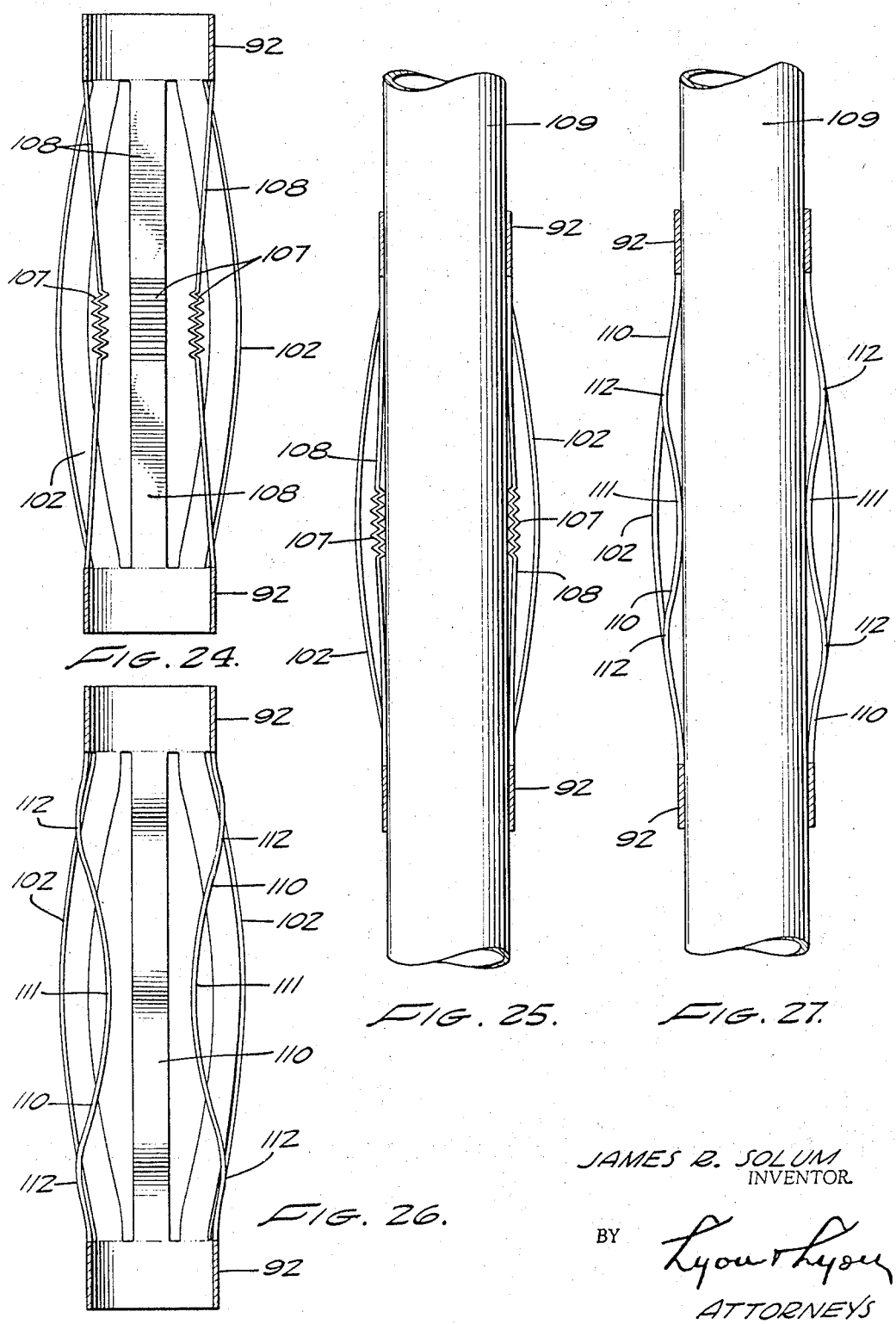

United States Patent Office 3,312,285
Patented Apr. 4, 1967

3,312,285
WELL PIPE CENTRALIZER
James R. Solum, Los Angeles, Calif., assignor to B & W Incorporated, Torrance, Calif., a corporation of California
Original application Oct. 2, 1962, Ser. No. 227,805, now Patent No. 3,270,697. Divided and this application Feb. 2, 1966, Ser. No. 524,553
3 Claims. (Cl. 166—241)

This is a divisional application of my copending application entitled, "Method for Forming a Pipe Centering Device and Such Device," Serial No. 227,805, filed Oct. 2, 1962, now Patent No. 3,270,697. This invention relates to devices for use on the exterior of pipes to be positioned in a well bore for centering the pipe in the well bore and/or scraping the well bore or well pipe. In particular, this invention is directed to a method for manufacturing such devices.

There are numerous conventional devices for centering a well pipe within a well bore and these devices are commonly known as centralizers. Centralizers are generally comprised of a pair of spaced and axially aligned collars adapted to fit the exterior surface of the well pipe and a plurality of outwardly bowed spring staves extend between the collars and are welded to each other. The staves are circumferentially spaced around the collars and are of spring steel so that the staves or bows engage the well bore and resiliently urge the well pipe toward the center of the well bore.

Under certain conditions, it has been found advantageous to scrape the well bore as the well pipe is lowered into the well bore and devices such as spiral centralizers have been found useful for this purpose. In spiral centralizers the spring bows extend between the spaced collars but the ends of the bows are angularly offset from each other so that the bows are positioned at an angle to the axis of the centralizer. It has also been found advantageous under certain conditions to scrape the exterior surface of the well pipe, such as for example, to obtain a better bond between the well pipe and cement placed in the annular space between the well pipe and the well bore.

There are also certain conditions encountered where it is required or at least desired that the well pipe be spaced from the well bore wall a certain minimum distance. In these situations, it is undesirable to use a centralizer with compressible spring bows and therefore rigid staves are used. These devices are known as rigid type centralizers.

Centralizers are conventionally made by forming a pair of collars of slightly greater inside diameter than the outside diameter of the well pipe on which the centralizer will be used. Each collar may be made of two half collars hinged together or from a single length of sheet metal rolled into a split ring and welded together to form a solid collar. The collars are then placed on a welding jig mandrel and spaced apart. The spring bows can be manufactured in any one of a number of ways of making leaf springs such as heating a length of flat spring stock to the required temperature, bending the spring stock to the desired bow shape, and quenching the bow to obtain the desired hardness and spring characteristics. The bows are then placed on the collars positioned on the mandrel and each end of the bow is welded to one of the collars. This welding step is duplicated for each of the bows, there being generally six or eight bows provided on the more common sizes of centralizers. It is readily apparent that in these sizes, twelve or sixteen individual welds of bow-to-collar must be made.

It is well known in the field of metallurgy that the welding of spring steel can cause many difficulties such as producing an unsatisfactorily weak weld, changing the hardness of the spring steel around the weld to reduce the "spring" of the steel and/or making the steel too brittle to withstand shock loading. Although various alloy spring steels have been found more conductive to being welded, the welding techniques employed must be carefully controlled or unsatisfactory welds will result. Moreover, these alloy spring steels are more expensive than common grades of spring steel and the welding rods which must be used are also more expensive. Furthermore, it is considered advisable and is often deemed necessary that a spring steel weld be tempered by heating the product within an oven to the desired temperature for a period of time and then properly cooling the product to thereby relieve some of the stresses caused by the welding.

Although a limited number of centralizers have been manufactured wherein the bows are riveted rather than welded to the collars, this method has generally been found unsatisfactory due to both the weakening of the bow at the location of the rivet and the cost of the machine steps that are necessary to accomplish such riveting.

It has been found that a centralizer must be of relatively rugged construction due to the handling and conditions which it will encounter. When the well pipe carrying the centralizer is lowered into the well bore, the centralizer will encounter irregularities and obstructions in the well bore causing compression and expansion of the spring bows or the well bore may be slanted so that a proportion of the weight of the well pipe will be supported by spring bows of the centralizer. This repeated flexing of the spring bows and the forces encountered in passing obstructions can cause failure of one or more of the welds between the spring bows and the collars if the weld is not structurally or metallurgically adequate. The malfunction of a tool such as the breaking of bows on a centralizer can be extremely expensive in the drilling and completion of wells in that it may be necessary to take various remedial steps to correct the defect caused by the malfunction.

In accordance with this invention, there is provided a method for manufacturing centralizers and like devices wherein the entire device is formed from a single blank of material and the spring bows for producing the centering forces are not welded to the collars.

Accordingly, it is a principal object of this invention to provide a method for manufacturing a centralizer from a single blank of material to thereby produce an inexpensive and dependable centralizer.

Another object of this invention is to provide a method for manufacturing a novel centralizer wherein the spring bows of the centralizer are integral portions of the collars rather than being welded to the collars.

A further object of this invention is to provide a novel method for manufacturing a centralizer wherein a minimum number of individual machine or manual operations are required.

A still further object of this invention is to provide a method for manufacturing a centralizer from a single blank of material wherein the configuration of the spring bows may be readily and widely varied for producing novel shapes of centering devices and well bore and pipe scraping devices.

A further and more detailed object of this invention is to provide a novel method of manufacturing a centralizer wherein a flat blank of spring steel is formed into a cylinder with the end portions welded together to form end collars and with the middle portion expanded to form the spring bows.

Other and more detailed objects and advantages of this invention will appear from the following description and the accompanying drawings:

In the drawings:

FIGURE 24 is a sectional elevation of a centralizer formed from the blank of FIGURE 19 having members formed in the step of FIGURE 23.

FIGURE 25 is a sectional elevation view showing the centralizer of FIGURE 24 installed on a well pipe.

FIGURE 26 is a modified form of centralizer produced by the method of this invention.

FIGURE 27 is a sectional elevation view of the centralizer of FIGURE 26 positioned on a well pipe.

Referring now more particularly to FIGURES 1 through 6, there is shown apparatus and steps for one manner in which the method of this invention may be practiced. The blank, generally designated 10, is formed from a flat sheet of metal of any desired thickness which is predetermined by considering the strength desired in the completed centralizer. The metal of blank 10 may be of any conventional type which is either relatively soft in its original unprocessed condition and may be heat treated to a sufficient hardness to produce satisfactory spring characteristics such as high yield strength, or of a type which is relatively hard in its original "as received" condition thereby exhibiting satisfactory spring characteristics but may also be formed in the steps of the method of this invention. There are numerous types of steels which will satisfy these requirements such as, but not limited to, plain carbon steels with a relatively high carbon content or alloy steels with a medium carbon content. The selection of a particular steel forms no part of this invention, although it is to be noted and will be readily apparent to those skilled in the art that various grades of steel may be used in the method of this invention which are unsatisfactory for construction of centralizers under conventional methods due to such factors as the need for welding the spring bows to the end collars in conventional methods.

Figure 1:
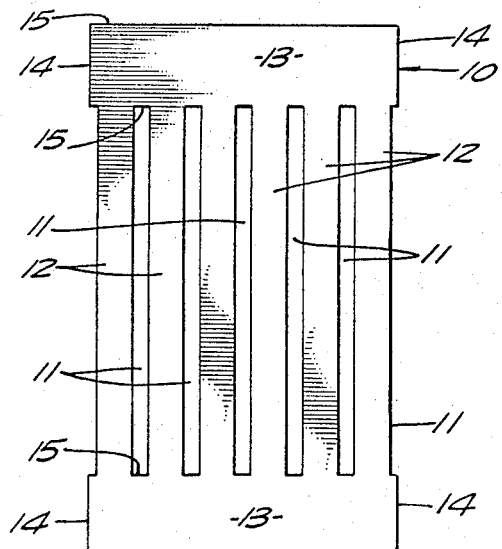
FIGURE 1 illustrates a blank for use in the method of this invention to produce a centralizer similar in appearance to the common type of conventional centralizer.

The blank 10 is cut from a flat sheet of metal by any convenient means of metal cutting, although it is preferred to use punch dies and a conventional punch press or hydraulic press. The blank 10 is formed by cutting out longitudinally extending and spaced strips to form apertures 11 and to leave a plurality of longitudinally extending and spaced ribs 12. The configuration and width of the ribs 12 may be varied as desired for producing a desired configuration of centralizer as will hereinafter become apparent. Although blank 10 of FIGURE 1 is generally rectangular, having ribs 12 extending the length of the blank, it is to be noted that a blank can take many different configurations and whether the blank is longer than it is wide will depend only on the relationship between the circumference of the well pipe for which the centralizer is intended and the length of the spring bows desired. For example, the blank of FIGURE 1, although not to scale, generally represents the shape of a blank that will produce a centralizer for a 5½ inch well pipe, will be approximately 25 inches long, and have six spring bows.

The strips which are removed to form apertures 11 may be of any desired width to leave the desired ribs 12 and the apertures 11 are each substantially the same length but do not extend the entire length of the blank 10. Solid panels 13 remain on each end of the blank 10. The panels 13 each have a pair of parallel ends 14 and a pair of parallel edges 15, the inner edges 15 being nominally defined by the aggregate of the ends of the apertures 11. The ribs 12 remain integrally joined to the panels 13 along the nominal inner edges 15.

Figure 2:
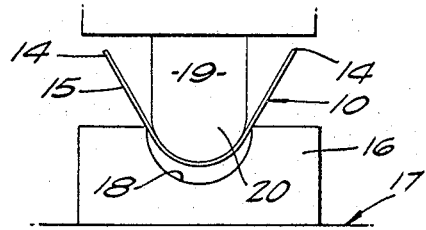
FIGURE 2 is a schematic illustration of the first step of the method of this invention for forming the blank of FIGURE 1 into a cylinder.

Referring particularly to FIGURE 2, the blank 10 is placed on a forming die 16 mounted in an appropriate apparatus such as punch press or hydraulic press, generally designated 17. The die 16 is provided with a semi-cylindrical cavity 18 and the center line of the length of the blank 10 is lined up with the center line of the cavity 18. That is to say, viewed in FIGURE 2, an outer edge 15 is visible rather than one of the ribs 12 being visible. The die 19 is also mounted on the press 17 and has a semi-cylindrical nose portion 20 for mating with the cavity 18. As the press 17 is closed in a conventional manner, the blank 10 will be formed into a U-shape in a manner well known to those skilled in the art of metal forming. It is to be noted that the dies 16 and 19 may be substantially the length of blank 10, thereby forming some of the ribs 12 into an arcuate cross-section or dies 16 and 19 may be comprised of separate pairs of dies mounted in spaced positions on the press 17 for engaging only the two panels 13 to thereby form the panels into U-shapes while leaving each of the ribs 12 relatively flat and extending between the pairs of dies. It is to be noted that in FIGURE 2, the press 17 is only partially closed and therefore the blank 10 has been partially formed.

Figure 3:
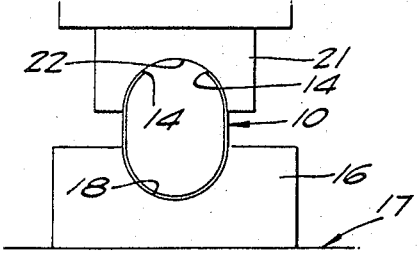
FIGURE 3 is a schematic illustration of the next step of forming the blank into a cylinder.
Figure 4:
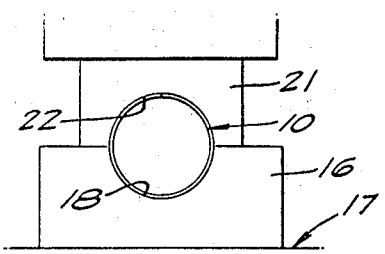
FIGURE 4 is a schematic illustration of the completion of the step of FIGURE 3 to form a cylinder of the blank of FIGURE 1.

In FIGURE 3 a die similar or identical to die 16 is mounted in the same or a separate press 17. The U-shaped blank 10 is positioned in the die 16 with the curved portion mating with the semi-cylindrical cavity 18. An upper die 21 is provided and has a semi-cylindrical cavity 22. As the press 17 is closed, the free ends of the U-shaped blank 10 are forced to follow the contour of the cavity 22 and when the press 17 is completely closed, the blank 10 is formed into a cylinder as shown in FIGURE 4. Again, it is to be noted that the dies 16 and 21 of FIGURES 3 and 4 may either be single long dies for forming the entire blank 10 or may be two pairs of dies appropriately spaced to form only the panel portions 13 of the blank.

The blank 10 thus formed into a long cylinder having longitudinally extending ribs 12 is then positioned in a press, generally designated 23, which is preferably a hydraulic press although the press 17 could be used. One of the now cylindrical panels 13 is positioned over a cylindrical mandrel 24 and is encircled by an annular flange 25. The other now cylindrical panel 13 is positioned over a cylindrical mandrel 26 mounted on the moving platform of press 23 and is encircled by an annular flange 27, also mounted on the moving platform of press 23. The mandrel 26 is provided with a downwardly extending tapered cone portion 28 adapted to engage the mating tapered inner surfaces 29 of a plurality of radially expanding dies 30. Dies 30 are appropriately mounted on mandrel 24 to permit radial movement of the dies in a manner conventional to internal expanding dies as is well known to those skilled in the art. In order to form the outwardly bowed staves of the centralizer, the press 23 is closed the desired amount to thereby force the ribs 12 to bulge outwardly. The amount which the blank 10 will be longitudinally "collapsed" to force the ribs 12 outwardly is determined by the amount of outward projection of the ribs which is desired in the final product. The dies 30 have curved outer surfaces 31 for engaging the inner surfaces of the ribs 12 to both force the ribs outwardly in a uniform manner and to somewhat force the ribs to conform to a desired profile as determined by the profile of surfaces 31. Further, if it is desired to obtain a perfectly uniform profile of the staves or bows 32 formed from the ribs 12 or if a particular profile is desired which cannot be obtained by merely forcing the ribs 12 to bulge outwardly, then back-up dies 33 may be provided. The back-up dies 33 have inner surfaces 34 shaped to give the desired profile of bows 32 when the ribs 12 are compressed between the outer surfaces 31 of dies 30 and the inner surfaces 34 of back-up dies 33. It is to be noted that the dies 30 and 33 may either be comprised of segments forming a complete circle or individual segments for engaging the individual ribs 12. Although the latter arrangement of dies 30 and 33 is preferred, it is to be noted that the cylindrically formed blank 10 must be oriented in the press 23 so that the ribs 12 are aligned with the individual dies 30 and 33.

Figure 6:
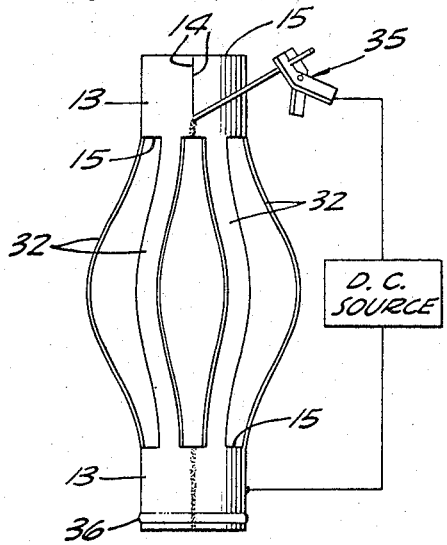
FIGURE 6 is a schematic illustration showing the welding step to form the centralizer collars.

The thus-formed blank 10 is removed from press 23 and the pair of now abutting ends 14 of each panel 13 are welded together such as by arc-welding apparatus, generally designated 35 shown in FIGURE 6. For this welding step, the formed blank may be appropriately positioned on a welding jig (not shown) so that the ends 14 are properly held for accomplishing the welding. After the welding has been completed, the cylindrical end panels 13 may be further sized and strengthened by forming an annular outwardly projecting bead 36 (as shown in the lower portion of FIGURE 6) in the panels by any convenient means such as a three-roller pinch type rolling machine with a beaded internal mandrel (not shown).

The bows 32 of the thus-formed centralizer shown in FIGURE 6 may be heat treated by any convenient means appropriate for obtaining the desired hardness for the particular steel used. This may be accomplished by heating the entire device or merely the bows 32 to the desired temperature and appropriately quenching the entire device or merely the bows 32.

Figure 7:
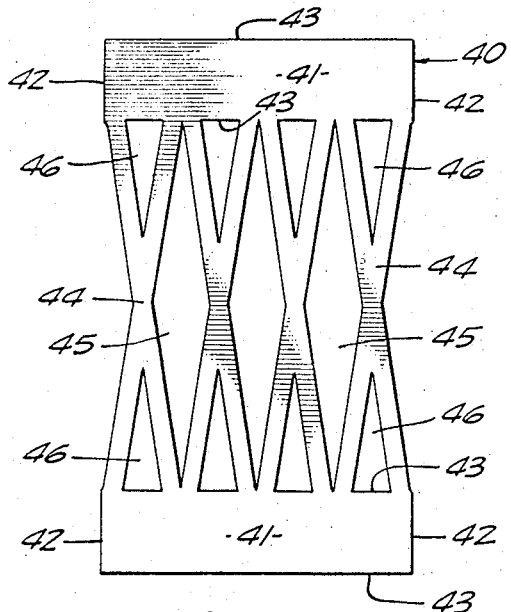
FIGURE 7 illustrates a modified form of blank for use in the method of this invention to produce a novel form of centralizer.
Figure 8:
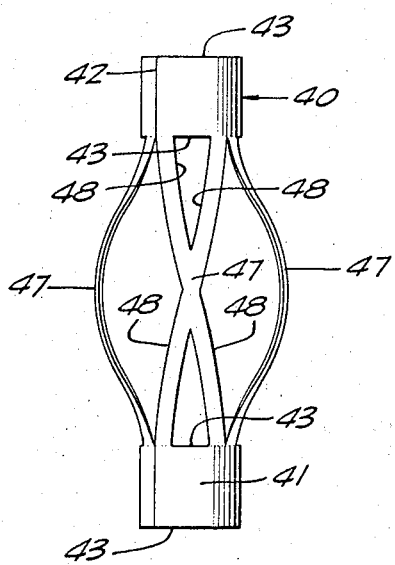
FIGURE 8 is an elevation view of the completed centralizer using the blank of FIGURE 7.

Referring now to FIGURE 7, a blank, generally designated 40, is illustrated which is similar to blank 10 in that it is provided with panels 41 having ends 42 and edges 43 similar to panels 13, ends 14 and edges 15, respectively, of blank 10. However, unlike ribs 12 of blank 10, blank 40 is provided with generally X-shaped ribs 44 defined by removing diamond-shaped strip to leave apertures 45 and triangular-shaped pieces to leave openings 46. The ribs 44 extend generally longitudinally between panels 41 and are integrally joined thereto along the inner edges 43. FIGURE 8 illustrates a centralizer formed from the blank 40 and having outwardly bowed staves 47 formed from the ribs 44. The staves 47 of this centralizer have a configuration with various attributes, but such configuration was heretofore impractical to manufacture under conventional methods. Using the above-described method of this invention as shown in FIGURES 2 through 6, it is possible to form centralizers such as that shown in FIGURE 8 having unusual bow configurations by merely altering the design of the blank to be used in the method. The staves 47 of the centralizer of FIGURE 8 have inclined edges 48 which serve as scraping elements similar to the conventional function of the inclined bows of spiral-type centralizers. However, since there are an equal number of edges 48 inclined in each direction relative to the axis of the centralizer, this centralizer does not tend to rotate the well pipe as has been found with conventional spiral centralizers.

Figure 9:
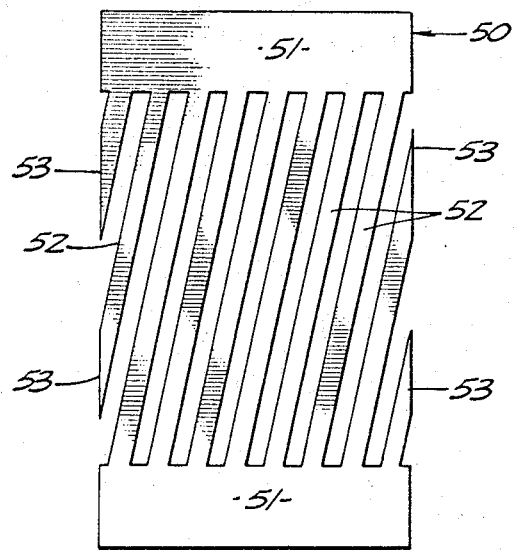
FIGURE 9 is another modified form of blank for use in the method of this invention for producing a centralizer similar to a conventional spiral centralizer.
Figure 10:
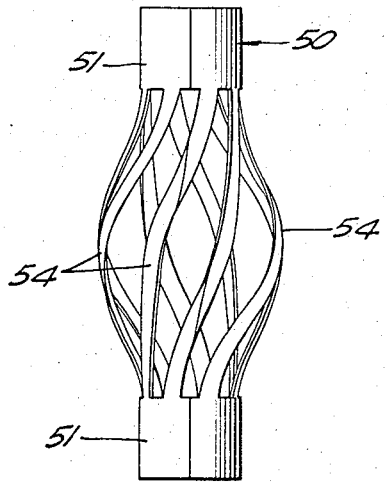
FIGURE 10 is an elevation view of the completed centralizer using the blank of FIGURE 9.

The blank 50 illustrated in FIGURE 9 is also similar to the blank 10, in that it is provided with end panels 51 for forming the end collars of the centralizer, but the ribs 52 of blank 50 are inclined to the length of the blank. When the blank 50 is formed into a centralizer using the heretofore described method of this invention, a centralizer is produced which is substantially similar in configuration to conventional spiral centralizers. With a rectangular blank 50 and inclined ribs 52, it may be seen that one or more of the ribs 52 have free ends 53 which must be joined to complete the longitudinally extending rib. It is preferred that such joining step be performed after the blank has been formed into a cylinder, such as after the step shown in FIGURE 4, and before the ribs are expanded to form the spiral-shaped bows 54.

Figure 11:
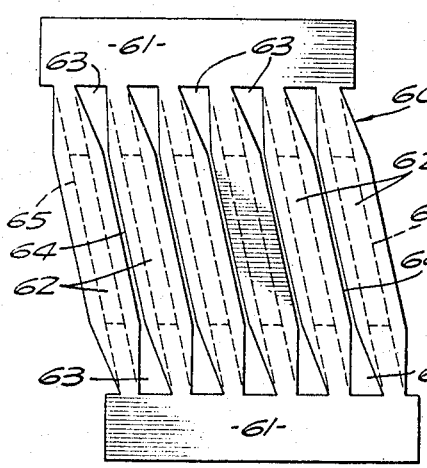
FIGURE 11 is another modified blank for use in the method of this invention for producing a novel form of rigid type centralizer.
Figure 12:
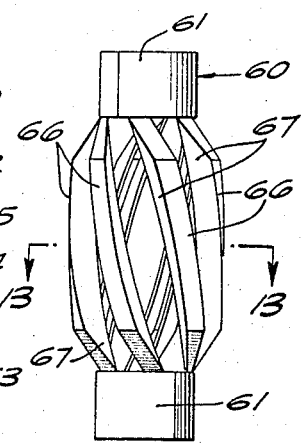
FIGURE 12 is an elevation view of the centralizer produced from the blank of FIGURE 11.
Figure 13:
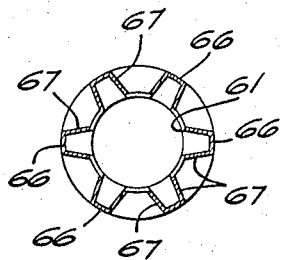
FIGURE 13 is a sectional plan view taken substantially on the line 13—13 of FIGURE 12.

In the blank 60 of FIGURE 11 panels 61 are provided for forming the end collars of the centralizers but the panels 61 are laterally offset making the blank 60 have the general shape of a parallelogram other than a rectangle. The ribs 62 of blank 60 extend longitudinally but are inclined similar to the ribs 52 of blank 50. However, the ribs 62 do not have free ends such as ends 53 of blank 50 due to the panels 61 being laterally offset. The strips of material removed to form the individual ribs 62 have enlarged end portions and a narrow connecting portion to leave an aperture having enlarged portions 63 and a narrow connecting portion 64. In forming the blank 60 into a centralizer using the heretofore described method of this invention, the back-up dies 33 and dies 30, shown in FIGURE 5, have an appropriate configuration for bending the ribs 62 inwardly along the edges shown by dashed lines 65. Each of the ribs 62 will thus be formed into channel-shaped staves 66, having inwardly projecting flanges 67. The centralizer of FIGURE 12 formed from blank 60 is similar to the type conventionally known as "rigid-type centralizers" except that the staves 66 extend at an angle to the length of the centralizer similar to a spiral type centralizer. The flanges 67, as shown in FIGURE 13, are not perpendicular to the outer surface of the well pipe and thus the staves 66 can yield inwardly a slight amount by the spreading of the flanges 67 of the individual stave upon application of a relatively large lateral force.

Figure 14:
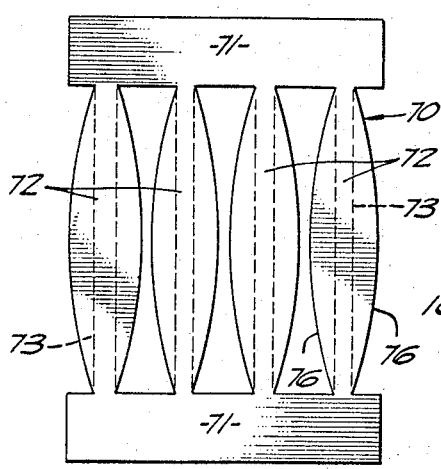
FIGURE 14 is another modified form of blank for use in the method of this invention for producing a novel form of rigid type centralizer.
Figure 15:
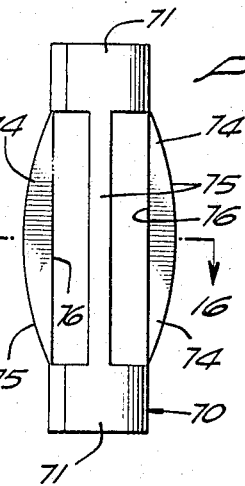
FIGURE 15 is an elevation view of a centralizer produced using the blank of FIGURE 14.
Figure 16:
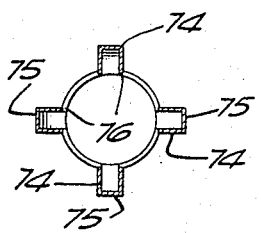
FIGURE 16 is a sectional plan view taken substantially on the line 16—16 as shown in FIGURE 15.

The blank 70 of FIGURE 14 for making the centralizer of FIGURES 15 and 16 is similar to heretofore described blanks in that it is provided with panels 71 joined by longitudinally extending ribs 72. The ribs 72 are similar to ribs 62 of blank 60 in that their ends are smaller than their mid-portions. As described with respect to the forming of blank 60, the use of dies 30 and 33 is essential in the forming of a centralizer from blank 70. The dies 30 and 33 serve to bend the ribs 72 along the dashed lines 73 to form inwardly projecting flanges 74 on each of the staves 75 formed from a rib 72. The edges 76 of each rib 72 are curved so that upon forming the ribs 72 outwardly to give the stave 75 a curved outer surface, the edges 76 assume a relatively straight line adapted to engage the outer surface of the weld pipe on which the centralizer is installed. The centralizer formed from blank 70 is of the type generally known as rigid-type centralizers.

Figure 5:
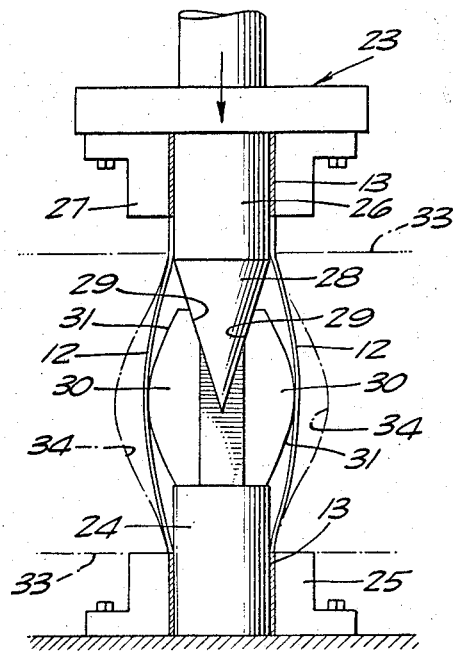
FIGURE 5 is a schematic illustration of the next step of expanding portions of the formed cylinder to form the centralizer bows.
Figure 17:
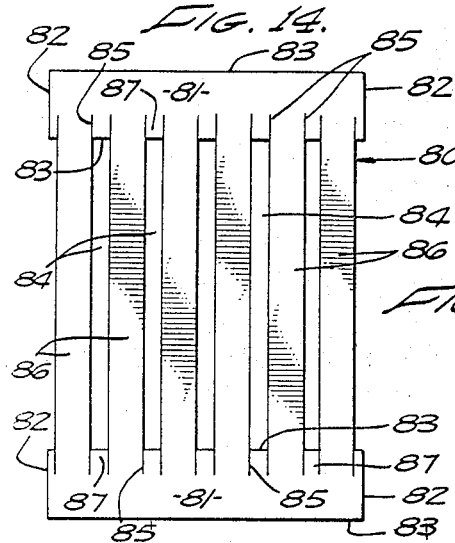
FIGURE 17 is another modified form of blank for use in the method of this invention for producing a novel form of centralizer similar to more conventional centralizers but having means for permitting the use of a stop collar between the end collars of the centralizer.
Figure 18:
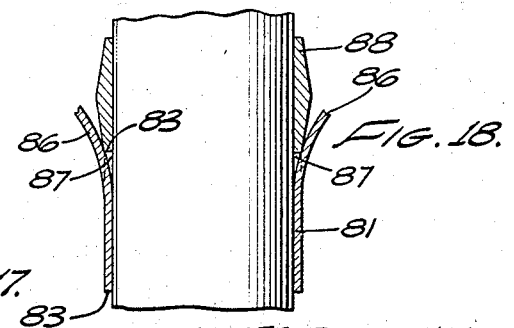
FIGURE 18 is a fragmentary sectional elevation view of a centralizer produced from the blank of FIGURE 17 and illustrating the use of a stop collar between the end collars of the centralizer.

The blank 80 shown in FIGURE 17 illustrates a modification which may be used on any of the heretofore described blanks or the blanks which will hereinafter be described. However this modification, although physically possible with the structures of FIGURES 11 through 16, is not particularly practical with such structures in that those structures have flanges (67 and 75) which extend inwardly and engage the well pipe. The blank 80 has a pair of panels 81 similar to panels 13 of blank 10 and other panels heretofore described. Panels 81 each have ends 82 similar to ends 14 adapted to be welded together as shown in FIGURE 6. The panels 81 each have a pair of edges 83 similar to edges 15 of blank 10 with the inner edges 83 being nominally defined by the ends of the aperture 84. However, in contrast to previously described blanks, portions of the panels 81 are slit as at 85 thereby extending the effective lengths of the ribs 86 beyond the inner edges 83 of the panels. The slits 85 are completely through the material of the panels 81, thereby creating tab portions 87 extending between each pair of ribs 86. In forming the blank 80 into a centralizer by the method heretofore described, the tabs 87 are retained as axial extension portions of the panel 81 by the engagement of the annular flanges 25 and 27 mounted in the press 23. The annular flanges 25 and 27, shown in FIGURES 5, are relieved between the tab portions 87 to allow the ribs 86 to be formed outwardly starting at the base of the slits 85. With a centralizer constructed of a blank having tabs 87, a conventional stop collar 88 may be mounted on the well pipe in a conventional manner between the end panels 81 of such centralizer as is desired in conventional practice. The stop collar 88 limits the axial movement of the centralizer along the well pipe by engaging the axially extending tab portions 87. Since the ribs 86 are formed outwardly from the tabs 87, the stop collar 88 will not engage these ribs. If a conventional stop collar was installed between the end collars of a centralizer formed by the method of this invention and not having the tabs 87, the stop collar would engage the under side of the bows or staves of the centralizer near their juncture with the panels and would tend to expand the cylindrical collars formed by the panels so that the centralizer might be damaged and/or slip past the stop collar.

Figure 19:
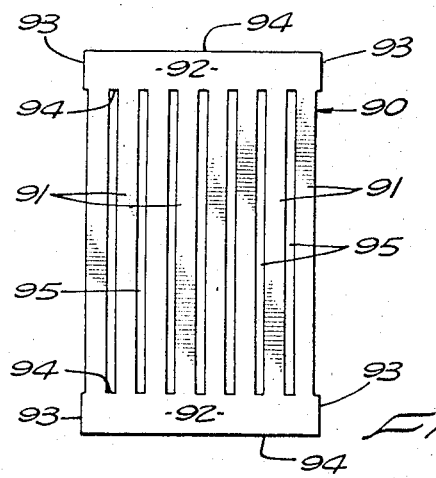
FIGURE 19 is another modified form of blank similar to the blank of FIGURE 1.

Referring now more particularly to FIGURES 19 through 22, a modified mode of practicing the method of this invention is shown. The blank, generally designated 90, of FIGURE 19 is substantially similar to blank 10 of FIGURE 1 except that there are eight ribs 91 rather than the six ribs 12 of blank 10. Blank 90 has end panels 92 defined by ends 93 and edges 94 with the inner edges 94 being nominally defined by the ends of the apertures 95 formed by removing strips between the ribs 91. This modified mode of practicing the method of this invention employs the use of a single blank such as blank 90 or any of the heretofore described blanks and the material of these blanks maybe of the types heretofore described.

Figure 20:
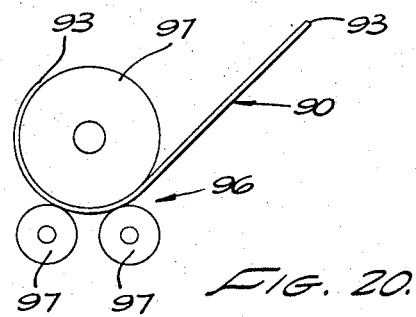
FIGURE 20 is an enlarged schematic illustration of a modified first step of the method of this invention for forming the blank into a cylinder.

Referring particularly to FIGURE 20, the blank 90 is inserted into a conventional three-roller type pinch rolling machine, generally designated 96, to form the blank into a cylinder having the ribs 91 extending longitudinally. The rollers 97 of rolling machine 96 may extend the entire length of the blank 90 or may be comprised of two pairs of three separate rolls 97 axially spaced to engage the two panels 92 of the blank 90 to form only the panels 92 into cylinders and leave the ribs 91 as longitudinally extending flat staves. The now cylindrical blank 90 has abutting pairs of ends 93 which are welded together by any convenient means such as flash welding shown in FIGURE 21. As is well known in the art of flash welding, the ends 93 are properly spaced so that an electrical potential across the contacts 98 gripping the panel 92 will cause an arc across the abutting ends 93 and appropriate forces in the direction of arrows 99 will cause the welding along the ends 93.

The thus-welded cylindrical blank 90 is then positioned on a press 100 of any conventional type. The cylindrically formed and welded panels 92 are fitted over cylindrical mandrels 101 mounted on the stationary and movable platforms of the press 100. The press 100 is then actuated to move the end panels 92 toward each other thus causing the ribs 91 to bulge outwardly to form the bows or staves 102 of the centralizer. This step of the method is relatively similar to the step performed and described with respect to FIGURE 5 except that internal dies, such as dies 30, are not provided. Using the press 100 of FIGURE 22, it is merely necessary to monitor the closing of the press so that the individual ribs 91 are all caused to bulge outwardly rather than inwardly. This may be accomplished in many ways such as by applying a nominal initial load and then manually forcing each rib 91 to bulge outwardly. If it is desired to make the configuration of the individual staves 102 uniform or of a particular profile, then back-up dies 103 (shown in phantom lines) may be provided having inner shaped surfaces 104 of the predetermined profile necessary to form the desired resultant profile of the staves 102. The thus-formed centralizer may then be appropriately heat treated, as heretofore described, for obtaining the desired spring characteristics.

Figure 21:
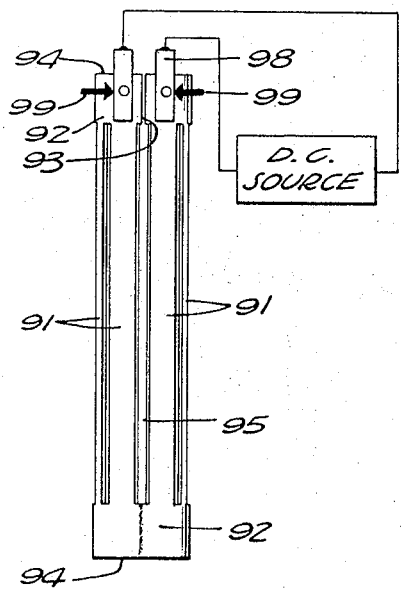
FIGURE 21 is a schematic illustration of a modified second step of the method of this invention for welding the end collars of the centralizer.
Figure 22:
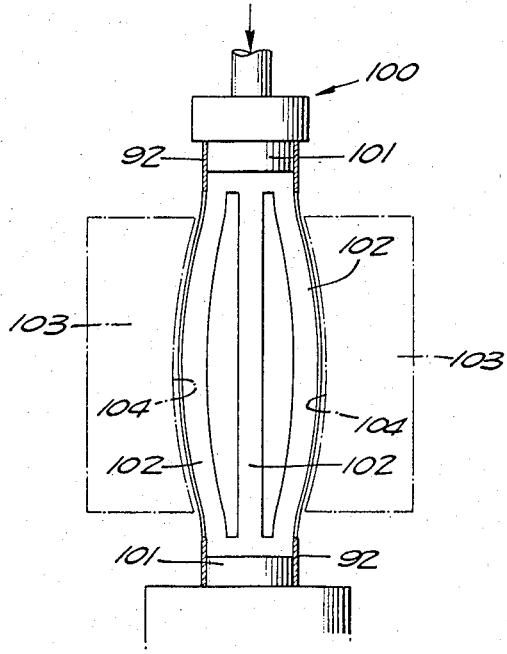
FIGURE 22 is a schematic illustration of a modified third step of the method of this invention for expanding portions of the blank to form the spring bows of the centralizer.
Figure 23:
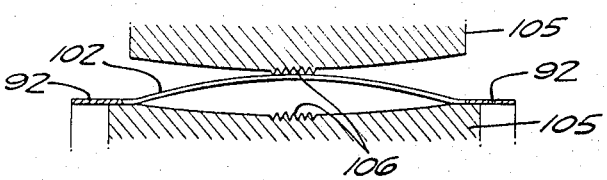
FIGURE 23 is a schematic sectional elevation illustrating a step for forming well pipe scraping members on the centralizer shown in FIGURE 22.

It will readily appear to those skilled in the art and is to be understood that certain of the steps and apparatus described with respect to FIGURES 2 through 6 may be substituted for certain of the steps and apparatus described with respect to FIGURES 20, 21 and 22 and vice versa. For example, the forming of the blank into a cylinder by the progressive dies shown in FIGURES 2, 3 and 4 may be accomplished by the rolling machine 96 of FIGURE 20 and yet the remainder of the first described mode of practicing the method of this invention may be used. Or, for example, the welding step of FIGURE 21 may be substituted for the welding step of FIGURE 6. When it is desired to form one or more ribs of a particular centralizer into a configuration having an unusual cross-section, such as those shown in FIGURES 13 and 16, there are numerous procedures and apparatus which may be used such as the heretofore described dies 30 and 33. It also becomes readily apparent that the step of forming this unusual cross-section in the ribs may be performed after the ribs have been bowed outwardly and this step could be performed on each individual rib separately. For example, FIGURE 23 schematically illustrates the use of mating dies 105 mounted in any convenient press for deforming individually selected staves 102 of the centralizer formed from blank 90. Here the dies 105 are provided with mating saw-tooth portions 106 to form a saw-tooth profile portion 107 on the selected staves of the centralizer shown in FIGURE 24 upon closing of the press.

FIGURES 24 and 25 illustrate a particular embodiment of a centralizer formed from blank 90 wherein four of the staves 102 are deformed by the dies 105 to form inwardly bowed staves 108 having the saw-tooth profiles 107. The saw-tooth portions 107 engage and scrape the exterior surface of the casing or well pipe 109 which is desirable under certain conditions. The cost of the centralizer of FIGURES 24 and 25 is not substantially greater than the cost of any centralizer manufactured by the method of this invention since only the additional step shown in FIGURE 23 must be employed. However, the cost of producing a centralizer similar to the centralizer of FIGURES 24 and 25 by conventional methods would be greatly increased due to the necessity for forming the individual staves having saw-tooth profiles and then welding each end of each stave onto the conventional end collars.

In the modified embodiment of a centralizer shown in FIGURES 26 and 27 and formed by the method of this invention from blank 90, four of the staves 102 bulge inwardly to produce novel profiled staves 110. It is preferred that each inwardly bulged stave 110 be positioned between two outwardly bowed staves 102 and vice versa. The staves 110 may be formed by appropriately shaped dies 30 and 33 used in the step described with respect to FIGURE 5 or may be individually formed from a conventionally formed stave 102 by appropriately shaped dies used in the same manner as the use of dies 105 described with respect to FIGURE 23. Referring more particularly to FIGURE 27, it may be seen that the staves 110 have a central portions 111 which engages the exterior surface of the casing or well pipe 109 and two outwardly bulged portions 112. A centralizer with bows of the configuration of staves 102 and 110 has many advantages which will be apparent to those skilled in the art such as the bows 102 providing an initial resistance to side movement of the well pipe 109 and the outwardly bulged portions 112 providing a secondary or "overload" type of resistance to side movement of the well pipe.

Thus, it may be seen that by this invention, a method is provided for manufacturing an extremely inexpensive and rugged centralizer. The individual steps in manufacturing this centralizer are greatly reduced over those necessary in manufacturing a centralizer by conventional methods. The amount of welding which is required is greatly reduced and the welded portion of a centralizer of this invention are not subjected to the continuous and repetitious bending and tension forces encountered by the welds on the spring bows of conventional centralizers. Moreover, by the method of this invention wherein a single blank is used, the number of different configurations which may be obtained for the bows or staves of the centralizer is virtually unlimited, whereas under conventional methods of manufacturing centralizers, the configurations obtainable were extremely limited due to structural and cost considerations.

Having fully described my invention, it is to be understood that I do not wish to be limited to the details herein set forth or to the details and embodiments illustrated in the drawings, but my invention is of the full scope of the appended claims.

I claim:
1. A well pipe centralizer having a pair of spaced cylindrical collars and a plurality of circumferentially spaced staves extending between said collars, said centralizer comprised of a pair of spaced panels and a plurality of spaced ribs extending between and integrally joined to said panels, each of said panels being formed into a cylinder having abutting ends and having an axis substantially aligned with the axis of the cylinder formed from the other said panel, said ribs extending longitudinally between said cylinders, said abutting ends of each cylinder being joined for forming the cylindrical collars, at least some of said ribs bowed outwardly from said collars to form the centralizer staves, and at least one other of said ribs being formed to a predetermined profile bowing inwardly from said collars and having a saw-tooth profile portion for engaging the well pipe.

2. A well pipe centralizer for resiliently centering a well pipe within a well bore, comprised of a pair of spaced and aligned collars adapted to fit the well pipe and a plurality of circumferentially spaced ribs extending between said collars, said ribs integral with and of the same blank of material as said collars, said ribs and collars being of a heat treatable spring steel, at least some of said ribs bowed outwardly between said collars and being heat treated to spring characteristics for engaging the well bore to resiliently center the well pipe, and at least one other of said ribs having a profile different from the said outwardly bowed ribs with such different profile including a longitudinally central portion positioned inwardly of said collars for engaging the exterior of the well pipe.

3. The centralizer of claim 2 wherein said longitudinally central portion of said different profile rib has a saw-tooth profile for engaging the well pipe.

References Cited by the Examiner

UNITED STATES PATENTS

| | | | |
|---|---|---|---|
| 1,394,925 | 10/1921 | Marshall | 29—163.5 X |
| 1,664,669 | 4/1928 | Denyes | 308—237 X |
| 1,775,376 | 9/1930 | Steps et al. | 166—241 |
| 1,991,988 | 2/1935 | Spatta | 29—477 |
| 2,009,496 | 7/1935 | Johnson | 113—116 |
| 2,258,052 | 10/1941 | Hall | 166—241 X |
| 2,311,768 | 2/1943 | McCray | 166—241 X |
| 2,622,684 | 12/1952 | Kluck | 166—241 |
| 2,636,564 | 4/1953 | Kluck | 166—241 |
| 2,659,439 | 11/1953 | Baker | 166—241 |
| 2,727,576 | 12/1955 | Hall | 166—241 |
| 2,927,953 | 3/1960 | Staller | 29—157.3 |
| 3,177,946 | 4/1965 | Hall | 166—241 |

CHARLES E. O'CONNELL, *Primary Examiner.*

D. H. BROWN, *Assistant Examiner.*